Oct. 15, 1957 R. PRYNE 2,810,009
HOUSING CONSTRUCTION FOR ELECTRICAL DEVICES
Filed Sept. 3, 1953
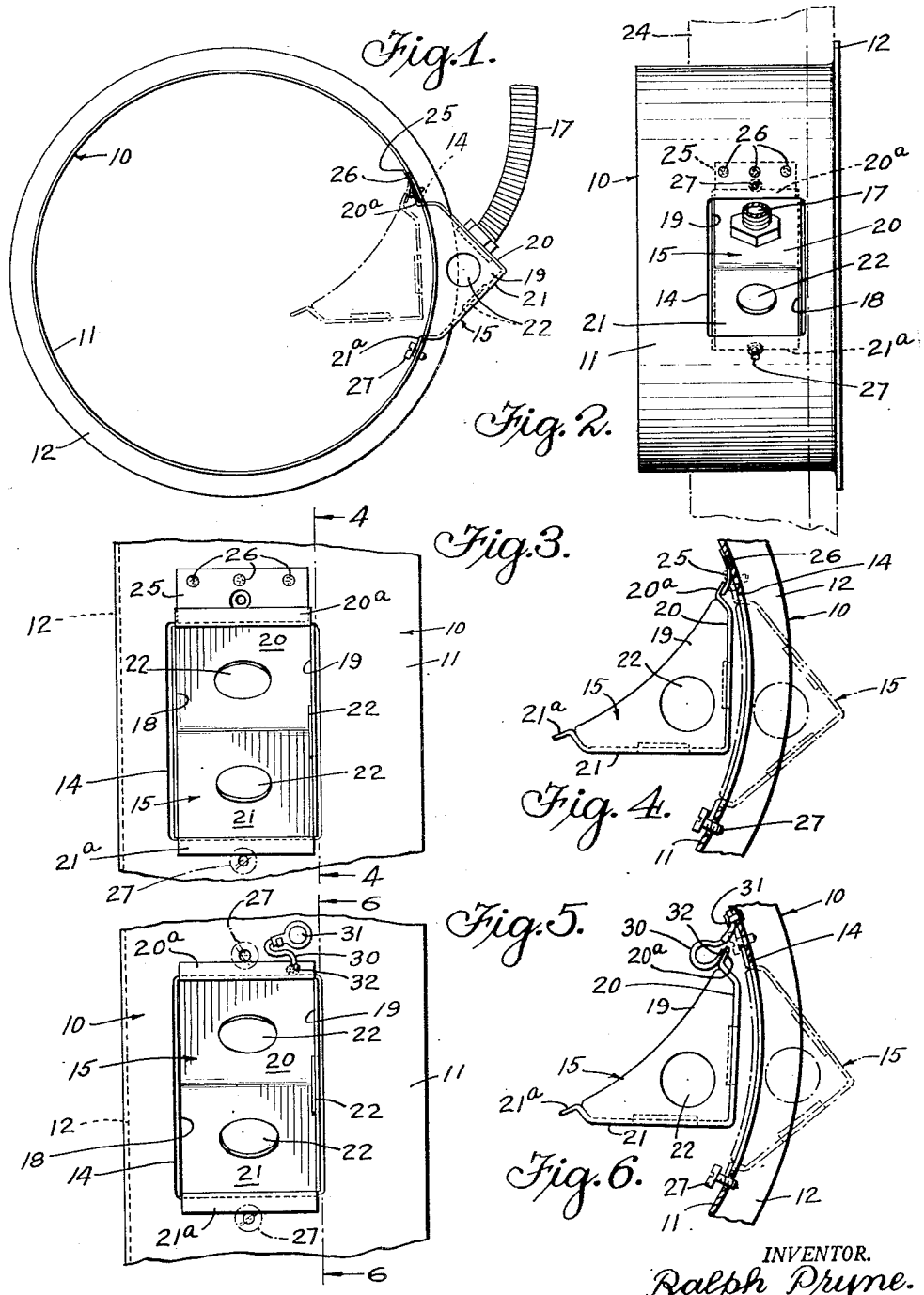
INVENTOR.
Ralph Pryne.
BY
Knight & Rodgers
ATTORNEYS.

United States Patent Office 2,810,009
Patented Oct. 15, 1957

2,810,009

HOUSING CONSTRUCTION FOR ELECTRICAL DEVICES

Ralph Pryne, Pomona, Calif., assignor, by mesne assignments, to Emerson-Pryne Company, Pomona, Calif., a corporation of Delaware Application September 3, 1953, Serial No. 378,291

8 Claims. (Cl. 174—51)

The present invention relates generally to metal housings for fans, lights, and other devices powered by electricity, and it relates more especially to a combination of a housing of this character with a splice box mounted upon the housing and connected thereto by means which affords a permanent electrical connection between the housing and the splice box.

Formerly, it has been the general practice to supply the housing and the splice box as two separate articles. These have been connected together, during installation in a building, by screws or the like which mount the splice box upon the outside of the housing. However, this construction has been found objectionable in many instances because the splice box has not always been adequately connected to the housing from an electrical standpoint so that the two members are not adequately grounded. As a consequence, various regulatory bodies, as for example, Underwriters' Laboratories, have established specifications that can be complied with only when the connection between the housing and the splice box is accomplished by welding or by rivets or by any other type of connection which may be described generally as being of a permanent type. Screws, nuts and bolts, and the like which may be easily disconnected and then reassembled at the site of installation are not permitted.

As a consequence of these specifications, the housing has been manufactured with the splice box rigidly welded to the housing wall. This construction is entirely adequate from the electrical standpoint; but it does not satisfy all conditions from the installation standpoint, especially when the housing is being installed in a building as a part of a remodeling job. In remodeling jobs, there is often need for installing in a wall or ceiling a new fan or light fixture; and it is always desirable to complete this installation with a minimum amount of cutting or removal of existing structure. The minimum amount of cutting can be accomplished only when the opening made is just slightly larger than the housing to be placed in the opening; but this size of opening will not receive a housing with a splice box rigidly mounted on the outside of the housing.

Hence, it becomes a general object of my invention to provide means for mounting a splice box upon a housing for an electrical device in such a manner that the splice box and housing are electrically connected together in a permanent manner.

It is also a general object of my invention to permanently connect together a splice box and a housing for an electrical device in such a manner that the splice box can be moved to a position entirely inside the housing during installation of the housing and then can be moved to a position in which it is substantially outside the housing to receive the conduit and electric wiring.

These objects of my invention are accomplished by mounting the splice box upon a wall of the housing by a flexible connecting means of an electrically conductive nature which is attached to the wall of the housing and to the splice box with a permanent type of attachment. The flexible nature of the connecting means permits the splice box to be moved to a position entirely, or nearly so, at one side of the housing wall, which position is inside the housing, to permit easy installation of the housing in a structural wall, after which the splice box may be moved through an opening in the housing wall to a normal position in which the splice box is substantially entirely outside of the housing.

For purposes of this disclosure, a "permanent" type of connection is one which continues or endures from the time the joint or connection is first made, without any material change in it. Such connections include those formed by welding, soldering or the like, or a rivet, or an integrally joined member, in contrast with a screw or nut and bolt which are designed to allow the parts to be separated and then rejoined or re-connected, perhaps several times, during or after installation of the equipment.

In a preferred embodiment, the flexible connecting means may be a resilient metal strip which is riveted or welded to the housing and to the splice box; but other types of flexible connecting members may be used.

How these and other objects and advantages of my invention are attained will be more readily understood by reference to the following description and to the annexed drawings, in which:

Fig. 1 is an elevation of a cylindrical housing for a fan, electric light, or a similar device showing a splice box mounted thereon according to my invention;

Fig. 2 is a side elevation of the housing and splice box as seen from the right of Fig. 1;

Fig. 3 is an enlarged fragmentary elevation of the housing and splice box as viewed from inside the housing of Fig. 1;

Fig. 4 is a vertical section on line 4—4 of Fig. 3 showing two positions of this splice box;

Fig. 5 is a view similar to Fig. 3 showing a modified form of flexible connecting means; and Fig. 6 is a vertical section on line 6—6 of Fig. 5.

There is shown in Figs. 1 and 2 a round metal housing for an exhaust fan, recessed light fixture, or other device which is powered by electricity. The housing consists of cylindrical wall section 11 provided at one end with annular flange 12. However, the shape of the housing or wall 11 is in no way limitative upon my invention. The housing is preferably made of sheet metal of suitable material and thickness; and wall 11 has a rectangular opening 14 in it with which a metal splice box 15, likewise preferably of sheet metal, is associated.

When installation of the housing is completed, splice box 15 is mounted on wall 11 as shown in Figs. 1 and 2 and conduit 17, of a conventional type, is connected to the splice box for the purpose of bringing into the box electric wires, which are not shown in the drawings.

When viewed from the front or back of the housing, splice box 15 appears to have a generally triangular shape which has been found advantageous for various reasons, but is not necessarily the only satisfactory shape. The splice box has two parallel side walls 18 and 19 approximately triangular in shape. Extending between these two side walls are two other walls 20 and 21 which converge towards each other to meet at the apex of the triangle. When the splice box is in use, these walls are almost entirely outside of housing wall 11, while the remaining side of the splice box is open and faces inwardly of housing 10. At the inner ends of walls 20 and 21 there are small oppositely and outwardly turned flanges 20a and 21a respectively which engage the inner face of housing wall 11 when the splice box occupies its normal position when assembled and in use, as shown in Fig. 1.

Each of the walls of the splice box is provided with a knockout 22, as is customary practice with electrical equipment of this type, which may be removed for a connection of a conduit and passage of wires into the box.

A flexible connecting means, which is also of metal in order to be electrically conductive, connects the splice box to the housing. In a preferred embodiment of my invention shown in Figs. 1 through 4 this flexible conducting means takes the form of a resilient metal strip 25 which is fastened at one edge to the inside face of housing wall 11 and along the other edge to flange 20a of the splice box. The means for fastening the metal strip to the splice box to the housing walls may be any means of a permanent nature; and the fastening is here shown as being spot welding indicated at 26. Other permanent, or non-removable, fastening means may be used instead as long as such means provides a joint between the flexible connecting means and the housing or the splice box, as the case may be, which will not be broken and then reassembled at the job site.

Connecting strip 25 is of lighter gauge than the walls of the splice box in order to be sufficiently flexible to allow the splice box to move as described below. For obvious reasons the splice box is a comparatively rigid member with walls designed to resist deformation. Since strip 25 is welded to flange 20a, it is in effect an integral extension of the flange; and it follows that the flange on the splice box can be connected directly to housing 11 as long as it bends enough to afford the needed range of movement of the splice box.

When in the finished or assembled position, splice box 15 is almost entirely outside of wall 11, as shown in Figs. 1 and 2. The splice box is held in place on the wall by one or more metal screws 27 which are screwed into a suitable opening in the housing walls so that the heads of the screws bear against one of the flanges 20a and 21a on the housing, to hold the splice box flanges firmly against the inside face of housing wall 11. The shape and size of the splice box is such as to substantially fill rectangular opening 14 in the housing wall.

When it is desired to install the housing in an opening in an existing structural wall 24, the opening in said wall need be no larger than is required to pass cylindrical wall 11 since the splice box may be pushed through opening 14 to a position as indicated in the dot-dash lines of Fig. 1 in which the splice box is completely inside housing wall 11. This can be done because of the flexible nature of connecting member 25 which allows swinging movement of the splice box through opening 14 in the housing wall.

When housing 10 is in place in a building wall, as indicated at 24, the splice box is pushed out through opening 14 in wall 11 to the full line position of Fig. 1 until flanges 20a and 21a engage the housing wall. The splice box is then held in position by placing screws 27 and tightening them against the flanges on the splice box.

It will be noted that connecting strip 25 allows the box to swing about an axis which is generally parallel to one edge of opening 14 and is located adjacent the opening. This swinging movement is in a direction which is parallel to the planes of splice box walls 18 and 19 so that they can pass through the opening with but very little clearance between them and the adjoining walls of the opening. However, the arcuate swinging motion of the splice box between the two positions shown in Fig. 1 is made possible by the shape of the splice box which permits the box to swing through the opening without striking the edge of opening 14 remote from the axis about which the splice box swings.

A modified form of my invention is shown in Figs. 5 and 6 in which the housing and splice box are constructed in the same manner as already described. The only change in this modified form of my invention is in the flexible connecting means for attaching the splice box to the housing. In these two figures, this connecting means takes the form of a flexible wire 30 which may be either a single round conductor or a braided conductor, preferably of copper or the like in order to obtain good electrical conductivity. Conductor 30 is securely fastened to the housing wall by rivet 31, which is a permanent type of connection. The other end of the conductor may likewise be riveted to flange 20a on the splice box; but an alternative type of connection is here shown in that the end of the conductor is soldered at 32 to the splice box, also providing a permanent type of connection. The conductor is made but little longer than the maximum distance between its points of connection in order to avoid undesirable slack in it. Accordingly, it limits the possible free movement of the splice box; and the movement of the splice box may be also characterized here as being a general swinging movement about an axis near one side of the opening 14 in the housing wall, although, because of the greater flexibility, conductor 30 does not as closely confine the splice box to a given path of motion as does connecting means 25.

As may be seen clearly in Fig. 6, the splice box may be moved to a position entirely inside the housing relative to wall 11 in order to permit installation of the housing in the wall 24 of the building structure; and then after the housing is in place, the splice box may be moved from the full line position to the dotted line position in which the splice box is substantially entirely outside wall 11 but with the flanges 20a and 21a in engagement with the inside face of the wall. In this form of the invention, a metal screw 27 is provided at each of the two flanges in order to securely mount the splice box in place.

Strip 25 as compared with wire 30 performs an additional function of supporting the splice box, especially when moved to the inside of housing 10. This is true because the strip is flexible in one direction only and acts like a hinge. But both provide a permanent electrical connection between the housing and splice box.

From the foregoing description it will be apparent that various changes may be made in the exact shape, arrangement and location of my improved housing and splice box without departing from the spirit and scope of my invention; and accordingly it is to be understood that the foregoing description is being considered as illustrative of, rather than limitative upon, the appended claims.

I claim:

1. In combination a metal housing for enclosing an electrically powered device, said housing including a wall having an opening therein; a metal splice box associated with said opening and of a size and shape to substantially fill said opening; and a flexible connecting means of electrically conductive nature attached to the wall and to the splice box with a permanent type of attachment, said flexible connecting means permitting movement of the splice box from a position entirely at one side of the housing wall to a position in which the splice box engages the wall but is substantially entirely at the other side of the wall.

2. A housing as in claim 1 in which the flexible connecting means is a resilient metal strip welded near one side to the housing and welded near the opposite side to the splice box.

3. A housing as in claim 1 in which the connecting means is a flexible wire.

4. A housing as in claim 1 in which the flexible connecting means confines movement of the box to a generally swinging movement about an axis near and generally parallel to one side the opening in the wall.

5. A housing as in claim 4 in which the splice box has two parallel side walls between which extend two mutually converging side walls, and the swinging motion is in a plane generally parallel to said parallel side-walls.

6. In a metal housing for an electrically powered device the combination comprising: a metal wall having an opening therein; a metal splice box normally substantially filling the opening and mounted upon the wall with substantially all the box at one side of the wall; and a metal electrically conductive mounting member welded to the housing and to the box and permitting the box to swing from said normal position through the opening to a second position in which the splice box is entirely at the other side of the wall.

7. In combination: a housing having a metal wall surrounding an interior space and provided with an opening; a metal splice box of a size to pass through the opening; a flexible metallic conductor conductively attached at spaced positions on the conductor to the splice box and to the inner face of the wall with a permanent type of attachment, the box being movable between a first position located wholly within said interior space and a second position in which the box is in the opening but lying substantially entirely outside the wall; and flange means on the box engaging the inner face of the wall when the box is in said second position to close the opening and prevent passage of the box entirely through the opening.

8. The combination as in claim 7 which also includes removable fastening means engaging the housing wall and the flange means to hold the splice box in said second position.

References Cited in the file of this patent

UNITED STATES PATENTS

| | | |
|---|---|---|
| 352,596 | Wilson | Nov. 16, 1886 |
| 1,334,172 | Ryerson | Mar. 16, 1920 |
| 1,505,629 | Dunning | Aug. 19, 1924 |
| 1,568,666 | Godley | Jan. 5, 1926 |
| 1,741,723 | Le Fever | Dec. 31, 1929 |
| 2,523,083 | Witkowski | Sept. 19, 1950 |